US006394518B1

(12) United States Patent
Kelley

(10) Patent No.: US 6,394,518 B1
(45) Date of Patent: May 28, 2002

(54) TILE SPACER REMOVER TOOL

(76) Inventor: Daniel E. Kelley, 31327 Emperor Dr., Canyon Lake, CA (US) 92587

(*) Notice: Subject to any disclaimer, the term of this patent is extended or adjusted under 35 U.S.C. 154(b) by 0 days.

(21) Appl. No.: 09/917,411

(22) Filed: Jul. 30, 2001

(51) Int. Cl.[7] .................................................. B25J 1/00
(52) U.S. Cl. .......................................... 294/61; 30/368
(58) Field of Search .......................... 294/19.1, 25, 26, 294/50, 50.5, 50.6, 61, 100, 115; 30/164.5, 164.6, 164.7, 323, 366, 368; 442/82

(56) References Cited

U.S. PATENT DOCUMENTS

| | | | | | |
|---|---|---|---|---|---|
| 93,937 | A | * | 8/1869 | Wilcox | 30/368 |
| 1,701,771 | A | * | 2/1929 | Di Stefano | 30/164.7 |
| 1,947,947 | A | * | 2/1934 | Liebl | 294/61 |
| 2,642,306 | A | * | 6/1953 | Beeler | 294/61 |
| 2,732,242 | A | * | 1/1956 | Belford | 294/61 |
| 2,943,389 | A | * | 7/1960 | Dubois | 30/368 |
| 3,183,031 | A | * | 5/1965 | Haberstick | 294/61 X |
| 4,833,780 | A | | 5/1989 | Pollock | |
| 5,209,685 | A | * | 5/1993 | Hammes | 294/61 X |

* cited by examiner

*Primary Examiner*—Johnny D. Cherry
(74) *Attorney, Agent, or Firm*—Loyal McKinley Hanson

(57) ABSTRACT

A tool for removing tile spacers includes a barrel having a bushing on its distal end portion, and a tile-spacer-engaging member disposed partially within a bore in the barrel. The tile-spacer-engaging member is disposed within the bore moveably for linear movement along the central axis of the barrel between a withdrawn position of the tile-spacer-engaging member in which a pick-shaped distal end portion does not extend out of the distal end of the bore and a deployed position of the tile-spacer-engaging member in which the pick-shaped distal end portion does extend out of the distal end of the bore. Components are provided for spring biasing the tile-spacer-engaging member in the withdrawn position. First and second handle members are attached to respective ones of the barrel and the tile-spacer-engaging member. They are adapted to be held by a person in one hand and to enable the person to move the tile-spacer-engaging member from the withdrawn position to the deployed position by squeezing the first and second handle members toward each other with the one hand.

5 Claims, 3 Drawing Sheets

TILE SPACER REMOVER TOOL

BACKGROUND OF THE INVENTION

1. Technical Field

This invention relates generally to construction equipment, and more particularly to a tool for removing tile spacers from their functional position between ceramic floor tile, or other tile.

2. Description of Related Art

The term "tile" herein refers to any of various flat or curved pieces of ceramic, stone, concrete, or other material used to cover floors, walls, counter tops, or other surface. The term "tile spacer" refers to the small components a craftsman places between the tile to efficiently and accurately space the tile as he applies the tile to a surface to be covered. In laying the tile on a floor, for example, the craftsman applies an adhesive (e.g., thin set mortar) to the floor. Then, he places the tile into position on the adhesive while positioning tile spacers between the tile for proper spacing. Then, he lets the installation set overnight.

A typical tile may measure about eight to eighteen inches square by ⅜ " thick, and a typical tile spacer for use with such tile may take the form of a 3⁄16-inch thick, molded plastic component having a cruciform configuration and ¼-inch wide fingers that form the cross, such as the tile spacers available under the trademark SUPERIOR from Superior Featherweight Tools Co., Inc. of the City of Industry, Calif. Typical tile spacers have other shapes too. The craftsman places the cross-shaped tile spacer at the corners of the square tile as he lays the tile on the adhesive. Depending on the size of the installation, the craftsman may install as many as one thousand or more tile spacers. The next day he must remove all the tile spacers in preparation for filling the spaces between the tile with grout, and doing so can be a problem.

The tile spacers are disposed within the narrow spaces between the tile, below the upper surface of the tile. They are often so tightly engaged by the tile and/or by the adhesive that they stubbornly resist removal. So, the craftsman typically uses a needle nose pliers to pull them free, and that can be a difficult, time-consuming task. Although U.S. Pat. No. 4,833,780 addresses the foregoing with a pick tool intended to facilitate removal of the tile spacers, the pick tool can sometimes require awkward two-handed operation and pushing against the tile to deploy the pick in order to stab and remove the tile spacers. Thus, a need exists for a better tile spacer remover tool.

SUMMARY OF THE INVENTION

This invention addresses the concerns outlined above by providing a tile spacer remover tool that facilitates one-handed operation for better deployment of the tile-spacer-stabber (i.e., a tile-spacer-engaging member). Two handle members are arranged so that a user can hold them in one hand and squeeze them toward each other to deploy the tile-spacer-engaging member. The user can deploy it without using two hands and without having to awkwardly bump up against the tile, and the tile spacer pops off of the tool when the tile-spacer-engaging member returns to a withdrawn position.

To paraphrase some of the more precise language appearing in the claims, a tile spacer remover tool constructed according to the invention includes a barrel and a tile-spacer-engaging member disposed partially within the barrel. The barrel has a proximal end portion, a distal end portion, a central axis, and a bushing on the distal end, and the barrel defines a bore extending along the central axis from a proximal end of the bore at the proximal end portion of the barrel to a distal end of the bore at the distal end portion of the barrel. The tile-spacer-engaging member is disposed partially within the bore. The tile-spacer-engaging member has a proximal end portion extending out of the proximal end of the bore and a pick-shaped distal end portion disposed within the bore. The tile-spacer-engaging member is disposed within the bore moveably for linear movement along the central axis of the barrel between a withdrawn position of the tile-spacer-engaging member in which the pick-shaped distal end portion does not extend out of the distal end of the bore and a deployed position of the tile-spacer-engaging member in which the pick-shaped distal end portion does extend out of the distal end of the bore.

Means are provided for spring biasing the tile-spacer-engaging member in the withdrawn position, and first and second handle members attached to respective ones of the barrel and the tile-spacer-engaging member. The first and second handle members are adapted to be held by a person in one hand and to function as means for enabling the person to move the tile-spacer-engaging member from the withdrawn position to the deployed position by squeezing the first and second handle members toward each other with the one hand. He does not have to push the bushing against a tile to deploy the tile-spacer-engaging member.

Thus, the apparatus of this invention significantly facilitates one-handed operation for better deployment of the tile-spacer-engaging member. The following illustrative drawings and detailed description make the foregoing and other objects, features, and advantages of the invention more apparent.

DESCRIPTION OF THE PREFERRED EMBODIMENTS

Figure 1:
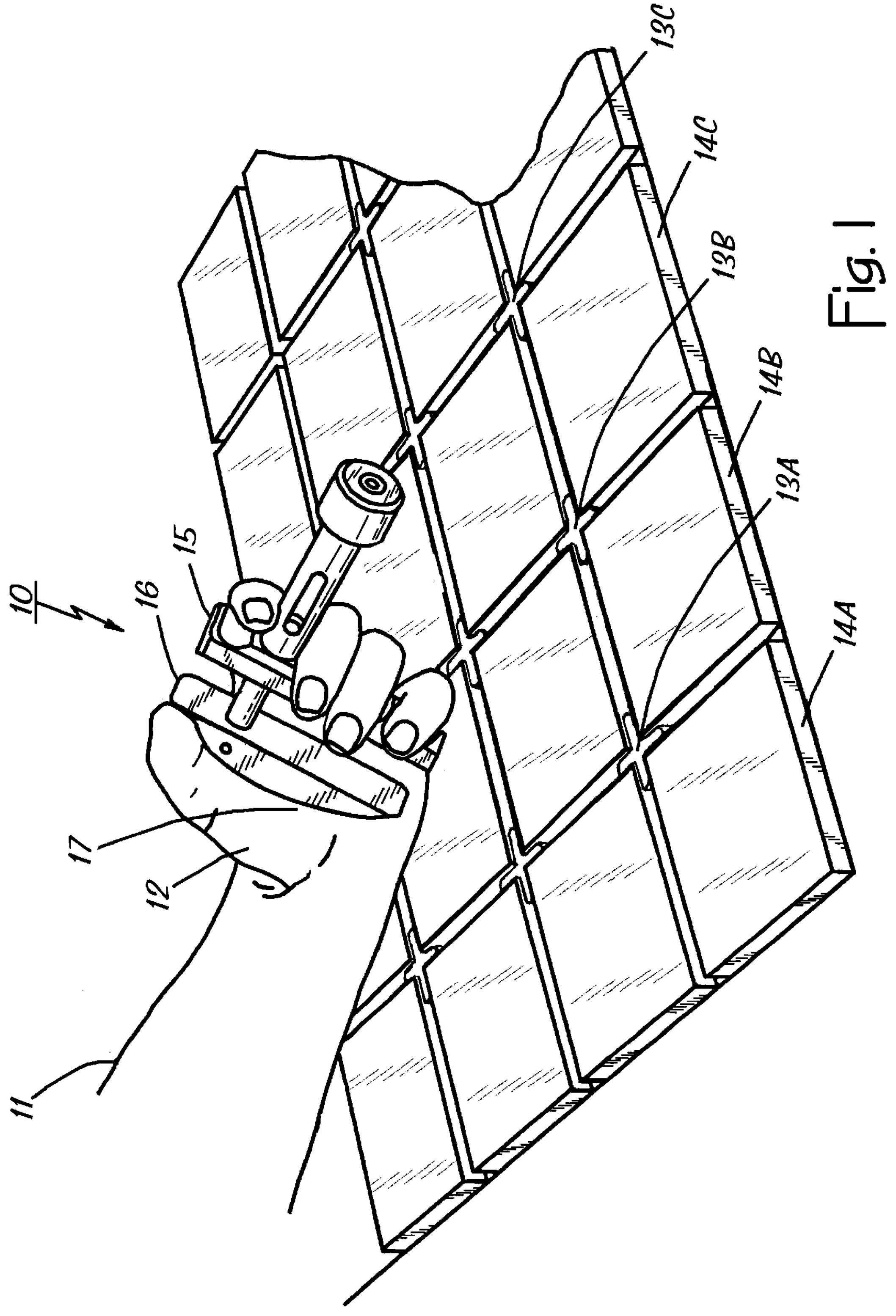
FIG. 1 of the drawings is an isometric view of a tile spacer remover tool constructed according to the invention in its normal environment, shown held by a person in one hand adjacent some newly laid tile separated by tile spacers.

FIGS. 1-5 of the drawings show various aspects of a tile spacer remover tool 10 constructed according to the invention. A tile man or other person 11 holds the tool 10 in one hand 12 as shown in FIG. 1. Then, he manipulates the tool 10 with the one hand 12 relative to tile spacers (e.g., tile spacers 13A, 13B, and 13C in FIG. 1) that are located between an array of tile (e.g., tile 14A, 14B, and 14C in FIG. 1) in order to dislodge and remove the tile spacers. That readies the tile installation for grouting.

Two handle members 15 and 16 of the tool 10 fit comfortably in his hand 12 for one-handed operation. The first handle member 15 is contoured to accept his fingers and the second handle member 16 is suitably curved to rest against the palm 17 of his hand 12 at the base of the thumb. He squeezes the handle members toward each other to deploy a tile-spacer-engaging member with a pick-shaped distal end portion that will be discussed subsequently with reference to FIGS. 2-4. Just three tile spacers 13A, 13B, and 13C and just three tiles 14A, 14B and 14C are identified in FIG. 1 for illustrative convenience in order to keep the figure less cluttered. The tiles (including the tile 14A-C) represent similar 3.5-inch, eight-inch, twelve-inch, or eighteen-inch square by ⅜-inch thick ceramic tile, and the tile spacers (including the tile spacers 13A-C) are all ¼-inch thick, cross-shaped, plastic tile spacers described later on with reference to FIG. 5. Of course, the tool 10 can be used with other types, sizes, and shapes of tile spacers and tile.

Figure 2:
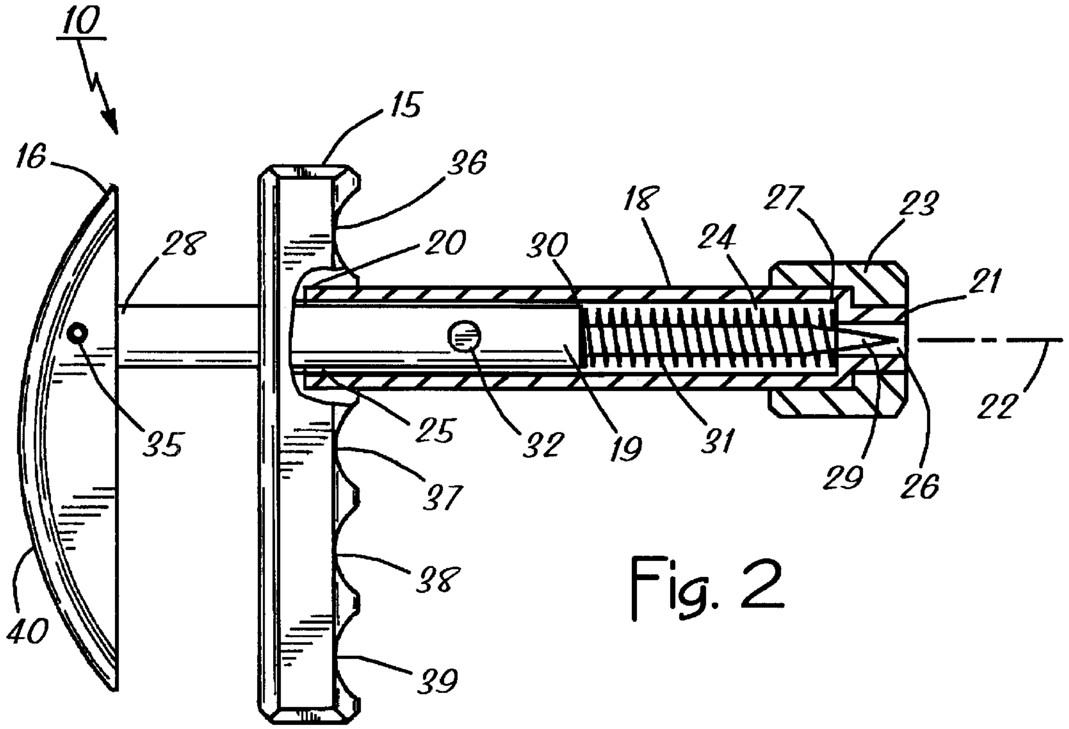
FIG. 2 is an enlarged front elevation view of the tile spacer remover tool illustrating the tile-spacer-engaging member in the withdrawn position, with portions of the barrel broken out to illustrate interior components in cross section as viewed in a vertical plane containing a central axis of the tool.
Figure 3:
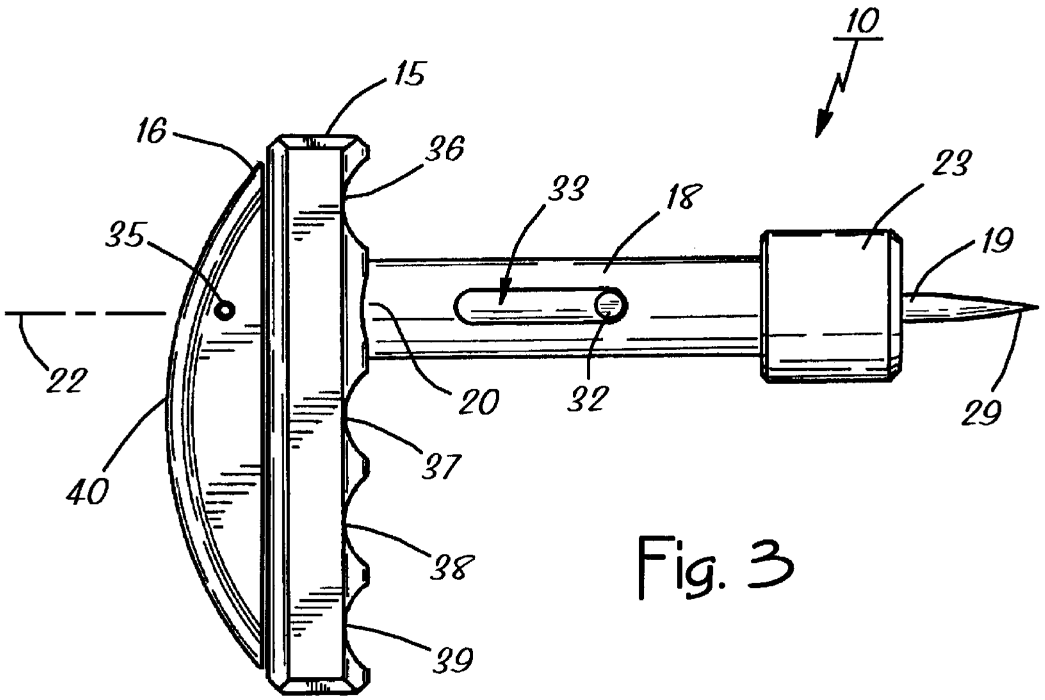
FIG. 3 is an enlarged front elevation view of the tile spacer remover tool, showing the tile-spacer-engaging member in the deployed position.
Figures 4, 5:
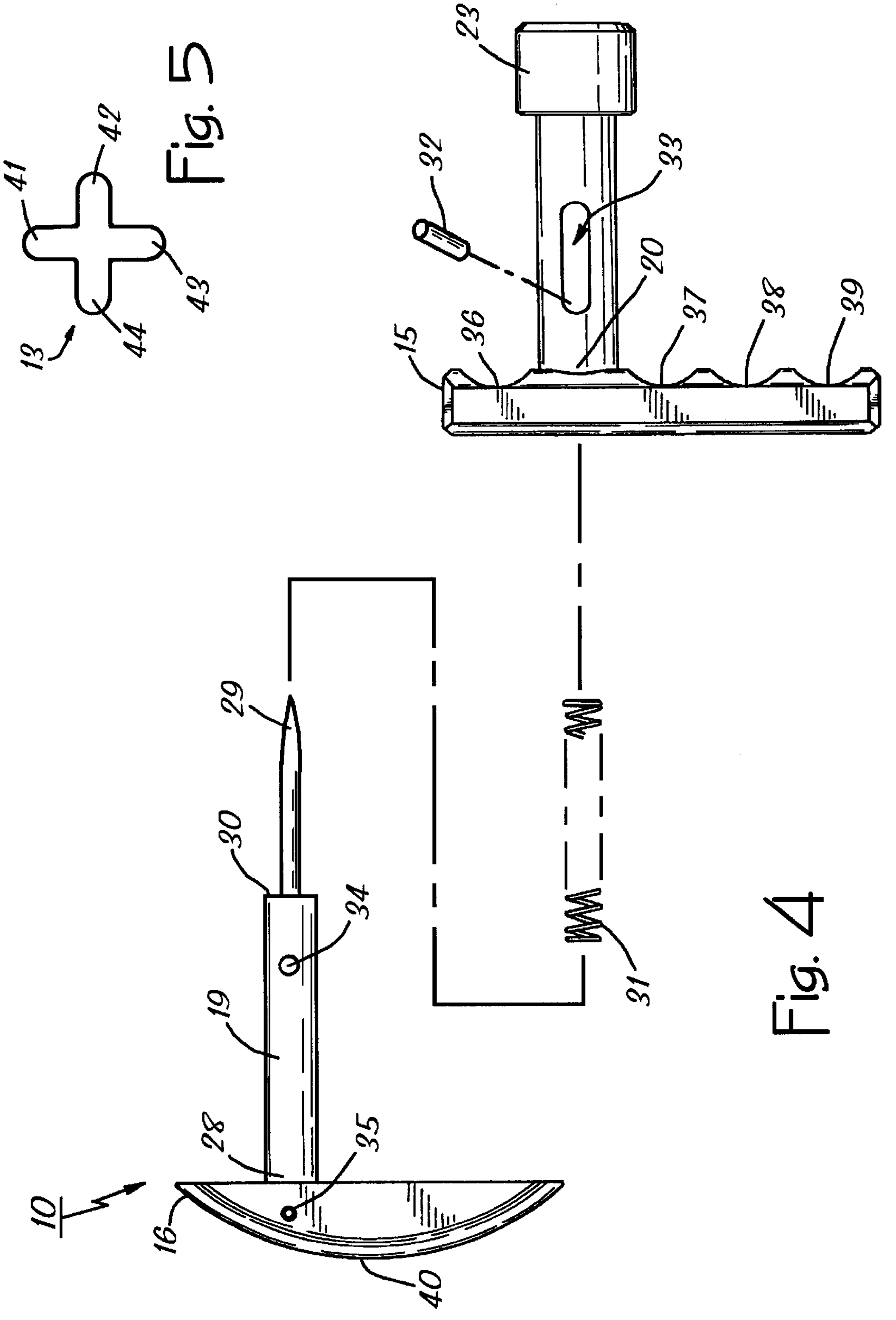
FIG. 4 is a disassembled view of the tile spacer remover tool showing the relationship of its various parts prior to assembly.
FIG. 5 is a plan view of a typical cross-shaped tile spacer that the tile spacer remover tool of the invention is used to remove.

Further details of the tile spacer remover tool 10 are shown in FIGS. 2–4. Generally, the tool 10 includes a barrel 18, a tile-spacer-engaging member 19 disposed partially within the barrel 18, and the first and second handle members 15 and 16. The barrel 18 (e.g., a 4.0-inch long, 0.75-inch outside diameter metal tube) has a proximal end portion 20, a distal end portion 21, and a central axis 22 (FIGS. 2 and 3). A bushing 23 (e.g., a one-inch long by 1.125-inch outside diameter component) is mounted on the distal end portion 21 as shown in FIGS. 2–4. The barrel 18 defines a cylindrical bore 24 (FIG. 2) extending along the central axis 22, from a proximal end 25 of the bore 24 at the proximal end portion 20 of the barrel 18 (FIG. 2) to a distal end 26 of the bore 24 at the distal end portion 21 of the barrel 18. The bore 24 has a main inside diameter (e.g., about a one-half inch diameter along the proximal 3.5 inches or so of its length). The main diameter reduces at the distal end portion 21 of the barrel 18 (e.g., to a little over 3⁄16 of an inch in diameter) to form a first spring-retaining shoulder 27 (FIG. 2). Of course, those precise dimensions may vary significantly within the scope of the claims.

The tile-spacer-engaging member 19 (e.g., a 5.75-inch long cylindrical metal shaft) has a proximal end 28 extending out of the proximal end of the bore 24 (FIG. 2) and a pick-shaped distal end portion 29 that is pointed for stabbing the tile spacers (including the tile spacers 13A–C and a tile spacer 13 described later on with reference to FIG. 5). The tile-spacer-remover member 19 has a main outside diameter along the proximal 3.5 inches or so of its length that is slightly smaller than the main inside diameter of the bore 24 so that a user can slide the shaft within the bore 24. The outside diameter of the tile-spacer-remover tool 19 then decreases to a little less than the inside diameter of the distal end 26 of the bore 24 (e.g., about 3⁄16 of an inch) to form a second spring-retaining shoulder 30 (FIG. 2). That also allows the distal end portion 29 to be moved axially and thereby deployed out of the distal end 26 of the bore 24.

Thus, the tile-spacer-engaging member 19 is disposed within the bore 24 moveably for linear movement (i.e., axial movement) along the central axis 22 of the barrel 18. It is moveable between a withdrawn position of the tile-spacer-engaging member 19 (shown in FIG. 2) in which the pick-shaped distal end portion 29 does not extend out of the distal end 26 of the bore 24 and a deployed position of the tile-spacer-engaging member 19 (shown in FIG. 3) in which the pick-shaped distal end portion 29 does extend out of the distal end 26 of the bore 24. A spring 31 (e.g., a ⅜-inch outside diameter helically coiled metal spring), or other suitable spring-biasing means, is disposed within the bore 24 between and abutting the first spring-retaining shoulder 27 and the second spring-retaining shoulder 30 (FIG. 2) where it functions as means for spring biasing the tile-spacer-engaging member 19 in the withdrawn position. A 0.25-inch diameter, cylindrical pin 32 (FIGS. 2–4) fits through a slot 33 in the barrel 18 (FIGS. 3 and 4) into a through bore 34 in the tile-spacer-engaging member 19 with a close fit to retain the tile-spacer-engaging member 19 within the bore 24 of the barrel 18. Of course, other means than the pin 32 may be employed.

The first and second handle members 15 and 16 are attached to respective ones of the barrel 18 and the tile-spacer-engaging member 19 by suitable means. The barrel 18 may be bonded or screwed into the handle member 15 and the tile-spacer-engaging member 19 may be held in a hole in the handle member 16 by a pin 35, for example. The handle members 15 and 16 are adapted in size and shape to be held by the person 11 in one hand (the hand 12 in FIG. 1) and to function as means for enabling the person to move the tile-spacer-engaging member 19 from the withdrawn position to the deployed position by squeezing the first and second handle members 15 and 16 toward each other with the hand 12. The handle member 15 includes finger-receiving contours 36, 37, 38, and 39 (FIGS. 2–4) while the handle member 16 includes a rearwardly facing, convex curved surface 40 that is adapted in size and shape to fit against the palm 17 of the hand 12 as shown in FIG. 1.

To remove a tile spacer from between some tile, the person 11 squeezes the handle members 15 and 16 toward each other to deploy the tile-spacer-engaging member 19. The person 11 easily deploys the tile-spacer-engaging member 19 that way without having to use two hands and without having to push the bushing 23 against one of the tiles. Next, he stabs the tile spacer with the pointed distal end, 29 of the tile-spacer-engaging member 19 and then removes the tile spacer from between the tiles. If needed, he places the bushing 23 against one of the tiles as a fulcrum so that he can pry the tile spacer free. The bushing 23 is a sufficiently soft, resilient, flexible, rubber or plastic component so that it does not mar the tile when used as a fulcrum.

FIG. 5 shows a tile spacer 13 for reference. It has four 0.25-inch wide, 0.5-inch long fingers 41, 42, 43, and 44 that form the illustrated cross-shaped configuration. It is used between square tiles laid as shown in FIG. 1. Other shapes and sizes are commercially available for different tile and tile patterns.

Thus, the invention provides a tile spacer remover tool that facilitates one-handed operation for better deployment of the tile-spacer-engaging member, without having to use two hands and without having to awkwardly bump up against the tile in order to deploy the tile-spacer-engaging member. The tile spacer even pops off of the tool when the tile-spacer-engaging member returns to the withdrawn position. Although an exemplary embodiment has been shown and described, one of ordinary skill in the art may make many changes, modifications, and substitutions without necessarily departing from the spirit and scope of the invention.

What is claimed is:

1. A tool for removing tile spacers, comprising:

a barrel having a proximal end portion, a distal end portion, a central axis, and a bushing on the distal end portion, which barrel defines a bore extending along the central axis from a proximal end of the bore at the proximal end portion of the barrel to a distal end of the bore at the distal end portion of the barrel;

a tile-spacer-engaging member disposed partially within the bore, the tile-spacer-engaging member having a proximal end portion extending out of the proximal end of the bore and a pick-shaped distal end portion disposed within the bore, which tile-spacer-engaging member is disposed within the bore moveably for linear movement along the central axis of the barrel between a withdrawn position of the tile-spacer-engaging member in which the pick-shaped distal end portion does not extend out of the distal end of the bore and a deployed position of the tile-spacer-engaging member in which the pick-shaped distal end portion does extend out of the distal end of the bore;

means for spring biasing the tile-spacer-engaging member in the withdrawn position; and first and second handle members attached to respective ones of the barrel and the tile-spacer-engaging member, which first and second handle members are adapted to be held by a person in one hand and to function as means for enabling the person to move the tile-spacer-engaging member from the withdrawn position to the deployed position by squeezing the first and second handle members toward each other with the one hand.

2. A tool as recited in claim 1, wherein the first handle member includes finger contours and the second handle member includes a rearwardly disposed curved surface adapted to fit against a palm of a hand.

3. A tool as recited in claim 1, wherein the barrel is a metal tube and the tile-spacer-engaging member is a metal shaft.

4. A tool as recited in claim 1, wherein the means for spring biasing the tile-spacer-engaging member in the withdrawn position includes a spring within the bore.

5. A tool for removing tile spacers, comprising:

a tube having a proximal end portion, a distal end portion, a central axis, and a bushing on the distal end portion, which tube defines a bore extending along the central axis from a proximal end of the bore at the proximal end portion of the tube to a distal end of the bore at the distal end portion of the tube such that the tube includes a first spring-retaining shoulder along the bore at the distal end portion of the tube;

a shaft disposed partially within the bore of the tube, the shaft having a proximal end portion extending out of the proximal end of the bore and a pick-shaped distal end portion disposed within the bore, which shaft is disposed within the bore moveably for linear movement along the central axis of the tube between a withdrawn position of the shaft in which the pick-shaped distal end portion does not extend out of the distal end of the bore and a deployed position of the shaft in which the pick-shaped distal end portion does extend out of the distal end of the bore, said shaft including a second spring-retaining shoulder;

a spring disposed within the bore between and abutting the first and second spring-retaining shoulders as means for spring biasing the shaft in the withdrawn position; and first and second handle members attached to respective ones of the tube and the shaft, which first and second handle members are adapted to be held by a person in one hand and to function as means for enabling the person to move the shaft from the withdrawn position to the deployed position by squeezing the first and second handle members toward each other with the one hand.

* * * * *